United States Patent [19]

Astle

[11] Patent Number: 5,485,611
[45] Date of Patent: Jan. 16, 1996

[54] VIDEO DATABASE INDEXING AND METHOD OF PRESENTING VIDEO DATABASE INDEX TO A USER

[75] Inventor: Brian Astle, Phoenix, Ariz.

[73] Assignee: Intel Corporation, Santa Clara, Calif.

[21] Appl. No.: 366,807

[22] Filed: Dec. 30, 1994

[51] Int. Cl.[6] .................................................. G06F 17/30
[52] U.S. Cl. ...................... 395/600; 382/236; 360/72.2; 348/564
[58] Field of Search ........................... 395/600, 153; 364/514; 360/72.1, 72.2; 348/563, 564; 382/236; 345/115, 119

[56] References Cited

U.S. PATENT DOCUMENTS

| | | | |
|---|---|---|---|
| 4,649,380 | 3/1987 | Penna | 340/750 |
| 5,083,860 | 1/1992 | Miyatake et al. | 352/129 |
| 5,157,511 | 10/1992 | Kawai et al. | 358/335 |
| 5,164,865 | 11/1992 | Shaw | 360/72.2 |
| 5,287,230 | 2/1994 | Kamide et al. | 360/60 |
| 5,365,384 | 11/1994 | Choi | 360/72.2 |
| 5,440,401 | 8/1995 | Parulski et al. | 358/342 |

*Primary Examiner*—Paul V. Kulik
*Attorney, Agent, or Firm*—William H. Murray; N. Stephen Kinsella

[57] ABSTRACT

A computer-implemented method for generating a video database index for indexing a video database comprising a plurality of video frames, the video database index comprising a plurality of index frames, wherein each video frame within the video database has a unique location within the video database. According to a preferred embodiment of the invention, the video frames of the video database are transmitted to a processor. A processor generates the index frames of the video database index in accordance with the amount of change occurring in images depicted by the video frames of the video database. Each of the index frames represents a unique video sequence of a plurality of video sequences that constitute the video database. Each video sequence comprises a sequence of video frames of the video database. Also, each video sequence has a unique location within the video database.

35 Claims, 4 Drawing Sheets

FIG. 1 VIDEO PROCESSING SYSTEM

VIDEO DATABASE INDEXING AND METHOD OF PRESENTING VIDEO DATABASE INDEX TO A USER

BACKGROUND OF THE INVENTION

1. Field of the Invention

The present invention relates to video processing and, in particular, to computer-implemented processes and apparatuses for indexing video databases.

2. Description of the Related Art

Video cassettes, also called video tapes, are frequently utilized as storage media to store video data. For example, a videocassette may be utilized to store two hours of home video movies. A typical VHS video cassette may also be utilized to store six hours of video footage. Often consumers store many hours of home video per year as a family video diary. Video data stored in this manner typically consists of sequences of images or video frames that constitute one or more motion pictures, when displayed on a monitor. In addition to video cassettes, video databases may also be stored on other storage media such as CD-ROM or hard disk drives. Also, a video database may be stored in analog or digital format in the storage medium.

As an example of a video database, a consumer's collection of home video movies stored on one or more video cassettes can be considered to constitute a video database of the consumer. As another example, a surveillance camera in a convenience store or bank that records a new video frame every few seconds can also generate a video database that is stored on a storage medium such as a video cassette.

In terminology typically associated with video, a "video shot" is a sequence of video frames that occurs between two scene cuts or other transitions such as fades or cross-fades. Thus, a video shot is a sequence of continuously-filmed or produced video frames generated by a video camera. For example, if a video camera is turned on to film a new event, and switched off one minute later, the video frames recorded on the video cassette during this one-minute time interval constitute a video shot. Such video shots may include pans, tilts, zooms, and other effects. Transitions between video shots may be by way of abrupt scene cuts, or by fades, wipes, dissolves, and the like.

Video databases typically contain a plurality of video shots, and the number of video frames and video shots stored in a given database can be extremely large. It is often difficult to access the particular contents of such video databases, however. It is easy to forget what has been recorded, and even if a user is searching for a known event, image, or video frame, the user often has forgotten the date of the event, the video cassette on which the event is recorded, or the location of the event on a particular video cassette. Because humans view video sequences sequentially and because of the large number of video frames and shots stored in video databases, it is difficult to locate specific events or video frames within a video database by searching manually for the event.

For example, a consumer who has produced several hours of home video movies may desire to locate a particular event, such as a hot-air balloon show previously filmed by the consumer, to show to his friends or to edit for an edited home video collection. The hot-air balloon event may occupy several minutes of footage somewhere on one of a plurality of video cassettes, and may comprise dozens of sequential video shots taken during the filming of the event. To find this scene, the consumer may need to resort to tedious sequential, hunt-and-peck searching of various video cassettes that constitute the video database, until the desired location is found. Even running the video cassette at high speed, such searching may be impractical. Further, there is a limit to how fast a video cassette may be played and the user still recognize scenes displayed. As another example, a user of the above-described surveillance video database may need to visually scan the surveillance video in order to find a particular video frame or frames that depict suspicious activity, such as a shoplifting incident.

Users of video databases can sometimes prepare indexes of the video database to make locating particular scenes more efficient. For example, each time a consumer shoots a new video scene or films a new event, he can write down a short description of the event along with a correlation to the appropriate location on the cassette. Alternatively, an index may be prepared by the consumer while viewing the video footage stored within the database. The location on the particular video cassette may be denoted by a time index or a counter index, for example. Thus, the user-prepared index may indicate that the hot-air balloon event appears on video cassette number 12, starting at time 1:17:23 (in hours:minutes:seconds format) from the beginning of the video cassette, and/or at counter number 2351 from the beginning of the tape.

However, preparation of such indexes is inconvenient and may not be sufficiently detailed to allow the consumer to locate a specific scene, image, or event. Also, if an index is not prepared during the filming of the home video, many hours of non-indexed video cassettes can accumulate, making the manual preparation of an index extremely inconvenient and infeasible. Further, some video databases are generated automatically, such as the surveillance example described above, so that the content of the database is not known until it is viewed. In this case an index cannot be prepared other than be viewing the entire video database and recording a description of its contents.

There is thus a need for a method and apparatus for video database indexing that avoids these problems.

It is accordingly an object of this invention to overcome the disadvantages and drawbacks of the known art and to provide a computer-implemented method and apparatus for indexing video databases.

It is also an object of this invention to provide for more efficient locating of particular scenes or images within video databases.

It is a further related object of this invention to allow more efficient scanning of the contents of a video database.

Further objects and advantages of this invention will become apparent from the detailed description of a preferred embodiment which follows.

SUMMARY

The previously mentioned needs and objectives are fulfilled with the present invention. There is provided herein a computer-implemented method for generating a video database index for indexing a video database comprising a plurality of video frames, the video database index comprising a plurality of index frames, wherein each video frame within the video database has a unique location within the video database. According to a preferred embodiment of the invention, the video frames of the video database are transmitted to a processor. A processor generates the index frames of the video database index in accordance with the amount of change occurring in images depicted by the video frames of the video database. Each of the index frames represents a unique video sequence of a plurality of video sequences that constitute the video database. Each video sequence comprises a sequence of video frames of the video database. Also, each video sequence has a unique location within the video database.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

The present invention exploits the fact that human visual systems are very efficient at pattern and object recognition. Thus, a limited number of representative index frames can be extracted or generated from the video database based on the amount of change in the video database, to form a video database index, which may be presented at a later time to a user, or in real-time in alternative preferred embodiments. The video database index allows the user to do a very efficient visual search of index frames displayed in parallel streams to locate portions of the video database of interest.

Video Processing System Hardware

Figure 1:
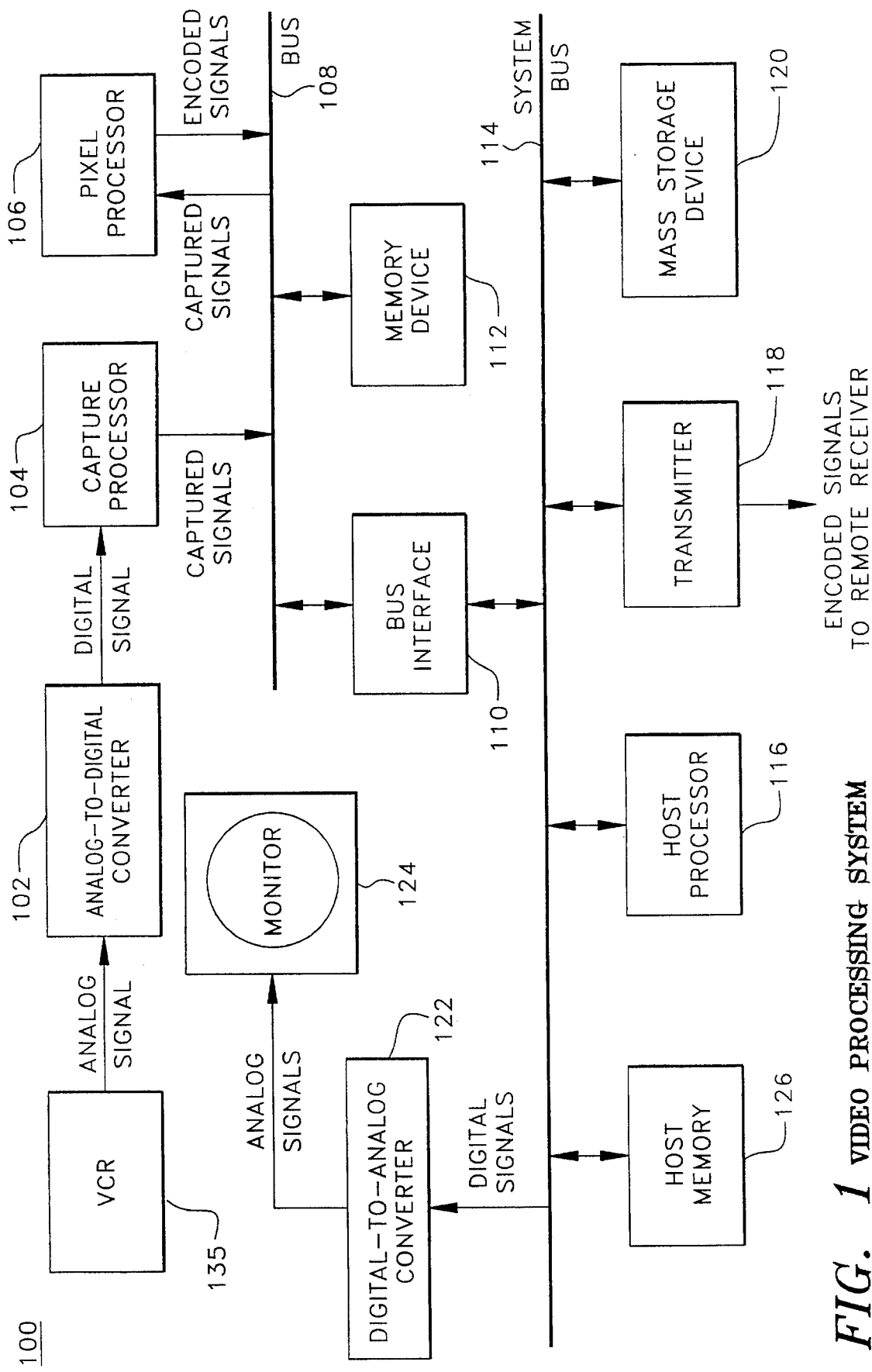
FIG. 1 is a computer-based video processing system for encoding video signals, according to a preferred embodiment of the present invention.

Referring now to FIG. 1, there is shown a computer-based video processing system 100 for processing and encoding video image signals (i.e. video frames), according to a preferred embodiment of the present invention. The purpose of video processing system 100 is thus to perform a prescan of the video database, extract representative frames, and present them to the user. Video processing system 100 receives video signals representing video frames in a video database, processes these video signals, and selects or generates certain video frames to be stored as index frames in a mass storage device, depending upon the amount of change in scenes depicted in the video database. These index frames form a video database index, i.e., a video database comprising index frames representative of the prescanned video database. In the present invention, such a video database index comprises a set of index frames much smaller in number than the video database, wherein each significantly different scene within the video database is represented by an index frame and, ideally, by only one index frame. Since the video database index will contain a much smaller number of video frames than a typical database, the index may be searched easily and quickly to find the desired event, as described more particularly below with reference to FIG. 4.

In video processing system 100 of FIG. 1, analog-to-digital (A/D) converter 102 of video processing system 100 receives analog video image signals representative of video frames from a video database source such as VCR 135. A/D converter 102 decodes (i.e., separates the signal into constituent components) and digitizes each frame of the analog video image signals into digital video frame component signals (e.g., in a preferred embodiment, Y, U, and V component signals). It will be understood by those skilled in the art that the video database source may be any suitable source of digital or analog video signals, e.g. a digital VCR.

Capture processor 104 receives, captures, and stores the digitized component signals as subsampled video frames in memory device 112 via bus 108. As those skilled in the art will appreciate, the digitized component signals may also be stored without subsampling in alternative preferred embodiments of the present invention for higher image quality. Each subsampled video frame is represented by a set of two-dimensional component planes or pixel bitmaps, one for each component of the digitized video frame signals. In a preferred embodiment, capture processor 104 captures video image signals in a YUV4:1:1 format, in which every (4×4) block of pixels of the Y (luminance) component plane corresponds to a single pixel in the U (chrominance) component plane and a single pixel in the V (chrominance) component plane.

Pixel processor 106 accesses captured bitmaps representative of video frames from memory device 112 via bus 108 and selects index frames from the video frames processed, as more particularly described below. The selected index frames are typically encoded for compression purposes before being stored in a mass storage device such as mass storage device 120. Pixel processor 106 thus generates encoded index frames that represent different scenes, each different scene being comprised of a plurality of captured video frames. Depending upon the particular encoding method implemented, pixel processor 106 applies a sequence of compression techniques to reduce the amount of data used to represent the information in each index frame. The encoded index frame may then be stored to memory device 112 via bus 108 for transmission to host processor 116 via bus 108, bus interface 110, and system bus 114 for storage in mass storage device 120. Mass storage device 120 in this manner may comprise a video database index which may be utilized as an index by a user, as described below, to locate specific images or events within the video database. Those skilled in the art will appreciate that system bus 114 and bus 108 may be merged into the same system bus 114. It will further be understood that host processor 116 may in alternative preferred embodiments perform the functions of pixel processor 106 described herein.

In this embodiment, host processor 116 may also transmit encoded video frames to transmitter 118 for real-time transmission to a remote receiver (not shown) for video conferencing purposes.

Host processor 116 may be utilized to decode encoded index frames that were previously encoded and stored in mass storage device 120, so that the index frames may be displayed and viewed by a user. Host processor 116 receives encoded index frames via system bus 114 that were stored in mass storage device 120. Host processor 116 temporarily stores the encoded index frames in host memory 126.

Host processor 116 decodes the encoded index frames and scales the decoded index frames for display, as more particularly described below. Decoding the encoded index frames involves undoing the compression processing implemented by pixel processor 106. Scaling the decoded index frames involves upsampling the U and V component signals to generate full-sampled Y, U, and V component signals in which there is a one-to-one-to-one correspondence between Y, U, and V pixels in the scaled component planes. Scaling may also involve scaling the component signals to a display size and/or resolution different from the image signals as original captured. Host processor 116 then stores the scaled decoded index frames to host memory 126 for eventual transmission to digital-to-analog (D/A) converter 122 via system bus 114. D/A converter converts the digital scaled decoded index frames to analog image signals for display on monitor 124. As described in further detail below with reference to FIG. 2, host processor 116 may also merge a plurality of decoded index frames, for example nine index frames, into a 3×3 tiled format within a single video frame for display on monitor 124.

Video processing system 100 is preferably a general microprocessor-based personal computer (PC) system with a special purpose video-processing plug-in board. In particular, A/D converter 102 may be any suitable-means for decoding and digitizing analog video image signals. Capture processor 104 may be any processor suitable for capturing digitized video image component signals as subsampled frames. Pixel-processor 106 may be any suitable means for encoding and processing subsampled video frames, where the means is capable of implementing functions such as a forward discrete cosine transform. Memory device 112 may be any suitable computer memory device and is preferably a dynamic random access memory (DRAM) device. Bus 108 may be any suitable digital signal transfer device and is preferably an Industry Standard Architecture (ISA) bus or Extended ISA (EISA) bus or a Peripheral Component Interface (PCI) bus. Bus interface 110 may be any suitable means for interfacing between bus 108 and system bus 114. In a preferred embodiment, A/D converter 102, capture processor 104, pixel processor 106, bus 108, bus interface 110, and memory device 112 are contained in a single plug-in board, such as an Intel® ActionMedia®-II board, capable of being added to a general microprocessor-based personal computer (PC) system.

Host processor 116 may be any suitable means for controlling the operations of the special-purpose video processing board and is preferably an Intel® general purpose microprocessor such as an Intel® i386™, i486™, or Pentium™ processor. Host memory 126 may be any suitable memory device used in conjunction with host processor 116 and is preferably a combination of random access memory (RAM) and read-only memory (ROM). System bus 114 may be any suitable digital signal transfer device and is preferably a PCI bus. Alternatively, system bus 114 may be an Industry Standard Architecture (ISA) bus or Extended ISA (EISA) bus. Mass storage device 120 may be any suitable means for storing digital signals and is preferably a computer hard disk drive or CD-ROM device. Mass storage device 120 may also be a digital or analog VCR that records video signals. Transmitter 118 may be any suitable means for transmitting digital signals to a remote receiver and is preferably transmits digital signals over PSTN lines. Those skilled in the art will understand that encoded video frames may be transmitted using any suitable means of transmission such as telephone line (PSTN or ISDN), RF antenna, local area network, or remote area network.

D/A converter 122 may be any suitable device for converting digital image signals to analog image signals and is preferably implemented through a personal computer (PC)-based display system such as a VGA or SVGA system. Monitor 124 may be any means for displaying analog image signals and is preferably a VGA monitor. VCR 135 may be any VCR suitable for transmitting analog video signals representative of images stored on a video cassette to analog-to-digital converter 102.

Selecting Index Frames

Index frames are selected in the current invention from the plurality of video frames constituting a video database based on the amount of change in scenes depicted in the video database, so that significantly different scenes, images, or video shots within the video database are represented by an index frame. Thus, each index frame represents a unique scene corresponding to a particular sequence of video frames, or "video sequence." As will be understood by those skilled in the art, an index frame is "representative" of its corresponding video sequence in that a user can recognize the represented video sequence by viewing the index frame. Thus, if the user is familiar with the particular scene represented, he may be reminded of the scene when he sees the index frame. If the user has forgotten or is unfamiliar with the scene, the user can get some idea of the visual contents of the images and features in the represented video sequence when he sees the corresponding index frame. These index frames constitute a video database index stored in a mass storage device, and may be viewed in an efficient manner by a user of the index to locate a particular scene, as described in further detail below with reference to FIG. 4. Those skilled in the art will appreciate that some video sequences may consist of a single video frame, although video sequences typically consist of a plurality of video frames.

Referring again to the hot-air balloon event discussed above as an example, the video database may contain several video shots (i.e., sequences of video frames between scene cuts) that were filmed during the hot-air balloon event. These video shots may in turn each comprise several video sequences, i.e. significantly different scenes. For example, during a single video shot the camera may pan away from hot-air balloons in the sky and towards people in a crowd on the ground watching the balloons. Because the images within the video shot change significantly during a pan, or when objects enter or leave the field of view, such a video shot can contain several video sequences, each of which is significantly different from the immediately preceding video sequence. A goal of the present invention is thus to determine video sequences within the video database that adequately represent different scenes within the video database, and to represent each video sequence with an index frame. The video database index will therefore adequately represent most or all of the different scenes, images, and objects depicted in the video database, but may be searched much more easily and quickly than can be the video database.

Continuing with this example, there should be an index frame stored in the index that is representative of each significantly different video sequence within each video shot of the set of video frames corresponding to the hot-air balloon event. Instead of tediously searching the entire video database to find the hot-air balloon event or various sub-events or particular images within the hot-air balloon event, a user can view the vastly smaller number of index frames stored within the video database index until an index frame representative of the hot-air balloon event or sub-event is observed. The index frame that is found can then be utilized to indicate the exact location of the corresponding video scenes in the video database. Because the number of index frames within the video database index is much smaller than the number of video frames within the video database, searching the video database index is much more practical and feasible than performing a manual search of the video database itself. Further, as described in detail below with reference to FIG. 4, the video database index may be designed to be more efficiently searched by a person than can be a standard video database.

As explained above, a hot-air balloon event that occupies several minutes' worth of events in a video database will very likely comprise several significantly different scenes or video sequences that should each be represented by an index frame. For example, as different balloons enter and exit the filmed scene (or as the camera pans), new index frames are periodically extracted, thus defining different video sequences, each represented by an index frame. Similarly, when the camera operator stops filming and resumes filming later, thereby creating a scene cut between two different video shots, the scene represented in the second video shot will usually differ substantially from the images in the previous shot. In this case, at least one new index frame should be extracted from the plurality of video frames constituting the second video shot because index frames representing the previous video shot will not adequately represent the different video frames of the second video shot.

Various techniques may be utilized to determine which video frames will be selected as index frames, i.e. to segment the video database into represented video sequences. For example, scene cuts may be detected, and thus video shots can be defined as occurring between such scene cuts. In one embodiment of the present invention, a single index frame can be selected per video shot to constitute the video database index. In this case each video shot is defined as a single video sequence.

Figure 2:
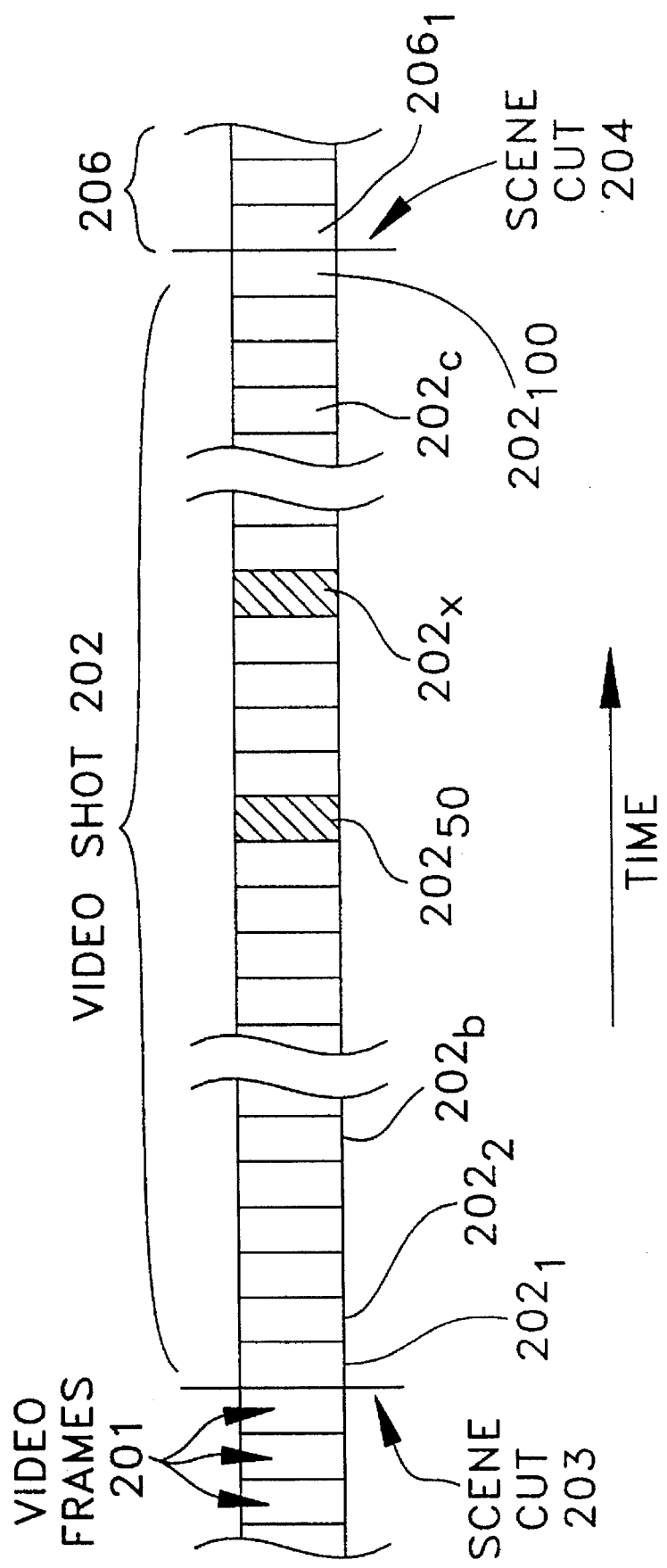
FIG. 2 depicts a diagram of a video shot with alternative representative index frames in accordance with the present invention.

Referring now to FIG. 2, there is depicted a diagram of a video shot 202 with alternative representative index frames in accordance with the present invention. These alternative index frames are shown shaded in FIG. 2. As will be understood, because video shot 202 will be represented by a single index frame, video shot 202 is coextensive with a video sequence 202 which is represented by an index frame. Video shot 202 may be defined as the sequence of video frames $202_1$–$202_{100}$ between two detected scene cuts 203, 204. Scene cut 204 is detected, for example, by determining an abrupt difference between video frames $202_{100}$ and $206_1$, or by detecting a fade-in and fade-out or other typical scene transition, as more particularly described below. Video shot 202 thus comprises a continuous sequence of 100 video frames $202_1$–$202_{100}$, any of which may be chosen as the index frame that will represent video shot 202. For example, the first video frame $202_1$, the last video frame $202_{100}$, or the middle video frame $202_{50}$, may be selected as the index frame to represent video shot 202. When a user scans an index containing the selected index frame and sees the index frame, the user will very likely recognize at least some of the events within video shot 202 and thus realize that he has located an index frame corresponding to the events portrayed in video shot 202.

Because transitions, fades, and the like often occur near scene cuts, a video frame centered between the endpoints of a video shot, such as frame $202_{50}$, may be more representative of the average content of the video shot than the video frames near the scene cuts. Alternatively, an index frame $202_x$ between frames $202_1$ and $202_{100}$ may be chosen such that the difference between frame $202_x$ and frame $202_1$ is approximately equal to the difference between frame $202_x$ and frame $202_{100}$. Frame $202_x$ will then represent a video frame that is "difference-centered" between the beginning and ends of video shot 200, rather than "time-centered" as frame $202_{50}$ is.

As will be appreciated by those skilled in the art, various differencing methods may be used to determine such differences. The basis of such a difference measurement, which is often utilized for block matching and frame differencing in motion estimation data compression techniques, is often a calculation known as the L1 Norm, which has the following form:

$$L1 \text{ Norm} = \sum_{i=0}^{i=n} \sum_{j=0}^{j=m} |a_{ij} - b_{ij}|$$

where:

$a_{ij}$ is a pixel in the ith row and jth column of the first video frame;

$b_{ij}$ is a pixel in the ith row and jth column of the second video frame;

n is the number of rows in a video frame; and m is the number of columns in a video frame.

It will be appreciated by those skilled in the art that the lower the difference indicated by the L1 Norm calculation, the more similar are the two video frames being compared. It will also be appreciated that calculations other than the L1 Norm may be utilized to perform difference measurements between two video frames. For example, the L2 Norm has the following form:

$$L2 \text{ Norm} = \sum_{i=0}^{i=n} \sum_{j=0}^{j=m} (a_{ij} - b_{ij})^2$$

It will also be understood that a very large difference between two consecutive video frames, i.e. a difference above a predetermined threshold, indicates a discontinuity or very abrupt change between the two video frames being compared. Thus, as those skilled in the art will appreciate, the L1 or L2 Norms may also be used to implement a scene cut detection technique as described above.

In the above-described preferred embodiment of the present invention, only one video frame is selected as an index frame to represent each video shot in the video database index. However, those skilled in the art will appreciate that more sophisticated techniques may be used to select index frames that better represent the contents of a video database. For example, more than one index frame per shot may be utilized to more accurately represent various scenes occurring within a single video shot. If a new object enters the field of view during a shot, or if the shot includes a pan sequence which brings completely new scenery or objects into the field of view, the video shot will contain a plurality of video sequences, each of which is significantly different than previous video sequences within the video shot. In this case, using a single index frame to represent the entire video shot will not be as representative of the multiple scenes as would be several index frames, each corresponding to one of the different video sequences.

Further, if the video shot contains fades and similar special effects, it may be desirable to detect and ignore such fades since they do not add new features to the video shot that a user would wish to locate, although they may mathematically differ greatly from other video frames in the same video shot and otherwise tend to cause an index frame to be extracted. For example, a single video shot of a relatively static image or scene may fade from black at the beginning of the shot and fade to black at the end of the shot. Where a single index frame (e.g. the time-centered or difference-centered video frame) will suffice to represent the entire video shot other than the faded portions, index frames do not need to be selected to represent the dark portions of the fades. Fades may be detected, as will be appreciated by those skilled in the art, by detecting overall contrast decreases or increases, while the underlying image features remain relatively static. Dissolves or cross-fades may also be detected with similar techniques. Fades and related effects may be detected and compensated for. For instance, any video frames occurring during a fade may be ignored for purposes of generating index frames, with an override for frame differences above a predetermined threshold. Alternatively, a certain number of video frames after and before scene cuts may be ignored for purposes of determining changing video sequences within the video shot, and for purposes of selecting index frames.

Figure 3:
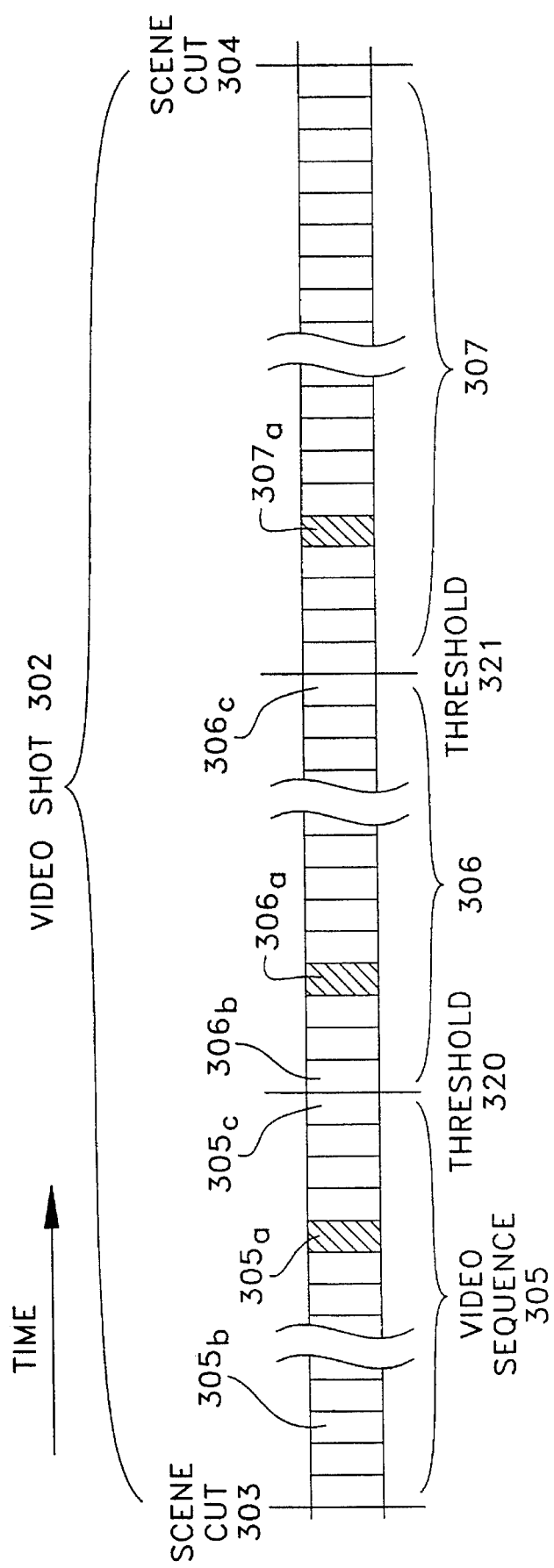
FIG. 3 depicts a diagram of a video shot with multiple video sequences having representative index frames in accordance with the present invention.

Referring now to FIG. 3, there is depicted a diagram of a video shot 302 with multiple video sequences having representative index frames in accordance with a further preferred embodiment of the present invention. These index frames are depicted as shaded frames in FIG. 3. FIG. 3 depicts video shot 302 defined between scene cuts 303 and 304. Video shot 302 itself contains several consecutive video sequences 305, 306, and 307, each of which depicts scenes which differ in some significant, determinable manner from the adjacent video sequences. Thus, in an alternative preferred embodiment of the present invention, multiple index frames may be selected to represent a single video shot such as video shot 302, where a single index frame cannot adequately represent the entire video shot because of many different scenes therein.

For example, once a scene cut 303 is detected, thereby marking the beginning of a new video shot (which ends at scene cut 304), pixel processor 106 may select a first index frame $305_a$ after the beginning of video shot 302 to represent the first video sequence 305. In this embodiment, no video frames will be considered for a small, predetermined number of video frames from the beginning of video shot 302, to ignore transitions. For example, the first 90 frames may be ignored in case a noisy transition, fade, or cross fade is occurring between video shots, or because of scene cut 303. Alternatively, fades and other transitions may be detected and video frames occurring during the fade ignored for purposes of determining index frames.

After taking such fades and related effects into account that might occur at the beginning of a video shot, pixel processor 106 chooses a first reference frame $305_b$ near the beginning of the video shot, and compares this first reference frame $305_b$ to each subsequent video frame until a video frame $306_b$ is reached wherein the difference between these two reference frames exceeds a predetermined threshold. For example, where pixels vary from 0 to 255, an average change of 4 units for video of 500×200 pixels (100,000 pixels), the L1 Norm would produce a difference of about 4*100,000=400,000 between the two reference frames. Video frame $305_c$ immediately preceding video frame 306B may be considered to be the second reference frame, because video frame $306_b$ will be the first reference frame for the next video sequence 306. Threshold point 320 can therefore be defined as occurring after second reference frame 305c as illustrated in FIG. 3. Threshold point 320 defines video sequence 305 as comprising the video frames between the previous threshold point (or scene cut such as scene cut 303) and threshold point 320.

Index frame $305_a$ is then selected from the range of video frames lying between first reference frame $305_b$ and second reference frame $305_c$. As will be appreciated by those skilled in the art, index frame $305_a$ may be selected from the range $305_b$–$305_c$ in the above-described manner in which a single video shot is represented by a single index frame. Thus, index frame $305_a$ may comprise first reference frame $305_b$, second reference frame $305_c$, or a video frame time-centered or difference-centered between these reference frames. It will be appreciated that a similar process is repeated to determine index frame $306_a$ of video sequence 306, by comparing video frames of this video sequence against first reference frame $306_b$. In alternative preferred embodiments, video frames of video sequence 306 may instead be compared against the previous index frame $305_a$ to ensure that consecutive index frames differ only by a maximum predetermined threshold.

It will be appreciated that the predetermined threshold difference at which the second reference frame $306_b$ is determined can be fine-tuned empirically depending upon several factors. As disclosed above, in a preferred embodiment a predetermined threshold corresponding to approximately a 10% difference between video frames may be utilized. A lower predetermined threshold difference will tend to cause second reference frames such as frame $306_b$ to be selected sooner, so that the video database is divided into a larger number of smaller video sequences than with a higher predetermined threshold. As will be understood, this will correspondingly cause a higher number of index frames to be generated, since each video sequence will correspond to an index frame which represents the video sequence. Although a lower threshold and larger number of index frames may better represent changing scenes within the video database, a larger video database index is more difficult to search because of its larger size. A very large video database index, for example comprising one-third the number of frames as the video database itself, would almost certainly be able to represent each different scene within the video database, but would be too large to practically search. A very small video database index, where each index frame represents several minutes' worth of footage in the video database, would very likely fail to represent within the index several objects or scenes within the video database because the granularity or resolution of the video database index would be too low to adequately represent the changing content of the video database. Therefore, a tradeoff must be made between how well each changing scene within the video database is represented in the video database index, and between having a manageably-sized index that may practicably be scanned.

It will be appreciated that the first and second reference frame concept may be utilized to select the index frame to represent video shot 202 of FIG. 2, which is discussed above. Thus, index frame $202_x$ may be selected to be a difference-centered video frame between first reference frame $202_b$ and second reference frame $202_c$ rather than between endpoint frames $202_1$ and $202_{100}$. First reference frame $202_b$ may be selected in the manner described above with respect to first reference frame $305_b$, e.g. after a predetermined number of frames from scene cut 203, or after the effects of a fade or related effect die down. Second reference frame $202_c$ may be determined in a similar manner but in reverse, e.g. it may be chosen to be the video frame occurring a certain number of video frames before scene cut 204.

It will further be appreciated by those skilled in the art will that alternative means for selecting the index frame to represent video shot 202 of FIG. 2 may be employed. For example, after determining first reference frame $202_b$, temporary index frames may be stored in memory at regular intervals until second reference frame $202_c$ is reached. Then, of the plurality of temporary index frames stored in memory, the index frame which is most difference centered between reference frames 202$_b$ and 202$_c$ may be selected to be the index frame to represent video shot 202.

It will further be understood that a similar technique may be employed to segment a single video shot into multiple video sequences where the video shot changes too much to be adequately represented by a single index frame. For example, referring once more to video shot 302 of FIG. 3, once first reference frame 305$_b$ is determined, temporary index frames may be stored in memory at regular intervals until scene cut 304, or, e.g., a fade to scene cut 304, is detected, at which time a second reference frame near or at scene cut 304 is selected. After video processing system 100 has determined scene cut 304, it may select the second reference frame, and analyze the stored temporary index frames to select the index frames to represent video shot 302. If any one of the temporary index frames can represent the entire video shot 302, the difference between this index frame and each reference frame will be below a predetermined difference threshold. Additionally, the difference between any two of the temporary index frames should also be below the threshold if the entire video shot can be represented by a single video sequence, i.e. by a single index frame.

However, often no single one of the temporary index frames can represent the entire video shot 302, as will be the case in the example of FIG. 3, since video shot 302 contains three video sequences. In this case a subset of the temporary index frames will be selected from the plurality of temporary index frames to represent different scenes within video shot 302. As will be understood, a minimal number of index frames will be selected from the plurality of temporary index frames such that the difference between any two consecutive index frames is less than the predetermined difference threshold. It will be understood that in such an embodiment the beginning and ending frames of the represented video sequences need not be determined or even determinable, since the plurality of index frames that represent the changing scenes within the video shot can be selected without defining such endpoints. Some of the video frames lying between two consecutive index frames may actually be represented by both index frames.

Referring again to video shot 302 and video sequences 305, 306, and 307 of FIG. 3, each entry within the video database index contains an index frame plus information relating to the location within the video database of the corresponding video sequence represented. Alternatively, the format of the stored index frames may be such that each index frame inherently includes information concerning the corresponding video sequence's location. Therefore, when a user locates an index frame of interest while scanning the video database index, he is supplied with, for example, the video cassette number and time index location for the corresponding video sequence. Such information may be stored by time-stamping each index frame with such information, as will be appreciated by those skilled in the art. Additionally, each index frame may include the location of the beginning and end of the corresponding video shot which the index frame represents, or, where the video sequence has clearly defined beginning and end points, information corresponding to the beginning and end of the video sequence represented by the index frame. Therefore, upon scanning the database and selecting an index frame, the entire corresponding video shot or video sequence can be displayed to the user.

It will be understood by those skilled in the art that each index frame in the video database index represents a unique video sequence of a plurality of video sequences that constitute the video database. Further, each video sequence has a unique location within the video database, because each video frame constituting a video sequence has a location within the video database, each video sequence has a location within the database, defined by the location of its constituent video frames, or by any one of them, such as the first video frame of the video sequence.

Motion Estimation and Other Video Processing Techniques

As described above, individual video sequences, each of which is represented by a single index frame, are defined by determining, after a given starting frame, when the scenes and features depicted in successive video frames have changed enough to warrant ending the video sequence. As described, scene cuts may be utilized to define video shots, each of which should be represented by at least one index frame. Each video shot may be segmented into constituent video sequences, each of which is represented by an index frame. Each video sequence is begun each time a scene cut is detected (e.g. by an abrupt difference between frames or by a fade out or fade in), or each time a difference between the current frame and the prior reference frame rises above a predetermined differential threshold, where transition video frames containing special effects like fades are ignored in calculating such differences.

It will be understood by those skilled in the art that several other methods may be utilized to determine when enough change has occurred to define a new video sequence that should be represented by its own index frame. Various object or feature recognition techniques may thus be utilized for more efficient or intelligent determinations of scene content change so that index frames are only generated when truly needed, and less redundant index frames are extracted and stored in the video database index. For example, as will be appreciated by those skilled in the art, an object recognition technique may be able to determine that a given object, such as a tennis ball, is moving across a relatively stationary background. As another example, where a person is waving her arms up and down against a relatively static background, video processing techniques may be utilized to track the movement of the arms over time across the background, as will be understood by those skilled in the art.

Motion estimation techniques may be utilized by video encoders that compress successive video frames. For example, a plurality of video frames may represent Successive images of a motion video. When these video frames are to be transmitted via a communication medium of limited bandwidth, or are to be stored in a storage medium having limited storage capacity, it is often desirable to first compress the data contained in the bitstreams. Motion estimation techniques exploit the temporal correlation that often exists between consecutive video frames, in which there is a tendency of some objects of image features to move within restricted boundaries from one location to another from frame to frame.

For instance, frame 1 may contain an object, and frame 2 may contain an identical set of pixels corresponding to the object spatially displaced by a few pixels from the location of the same set of pixels in frame 1. If frame 1 is transmitted to and received by a pixel processor or video processor (which performs any necessary decompression or other decoding), frame 2 may be transmitted without the pixels corresponding to the object. Instead, information such as motion vectors or pointers is sent along with frame 2 (which may also be compressed using other techniques). These motion vectors may be utilized by the receiving video processor when decoding the received video frame 2 to reproduce the object from frame 1 at a new location within frame 2. Since such motion vectors can be represented with fewer bits than the pixels that comprise the object, fewer bits need to be transmitted (or stored) in order to recreate the object in Frame 2.

The motion estimation procedure may be performed at the encoder level by comparing given regions or blocks within a current video frame to many regions or blocks within the previous video frame. The process of comparing a given block of one frame to blocks of another frame to find a sufficiently similar match is often called "block matching." Blocks are matched by determining a "difference measurement" between any given pair of blocks. A difference measurement, such as that resulting from the above-described L1 or L2 Norm, corresponds to the overall degree of difference of the two regions. If the difference measurement is below a predetermined threshold, the blocks are considered to be similar enough that a block match is indicated. If so, the block in the previous video frame may be utilized as described above by the video decoder to reproduce the same block in the current video frame.

Many of the techniques used for motion estimation may be utilized to perform more sophisticated differencing between various video frames, as will be appreciated by those skilled in the art. For example, consider two consecutive video frames 1 and 2 containing a background scene of a stationary playground with a blue sky, and an airplane flying across the sky. In frame 1 the plane may be in the left half of the frame, across the blue sky background; while in frame 2, because the plane is moving horizontally across the field of view of the camera, the plane is in the right half of the video frame. Using only the L1 or L2 Norm to determine differences between two frames, a large amount of difference may be detected between frames 1 and 2 since the two different regions occupied by the plane will not match. However, if block matching is performed, the plane may be recognized in the two frames, and a lower overall difference will be generated.

Such techniques may be exploited in the current invention, as will be appreciated by those skilled in the art, to more selectively generate or extract index frames. For example, a video shot may contain a large red balloon floating across a field of view of a uniform blue sky, from the far left of the screen at the beginning of the video shot to the far right at the end of the video shot. Simple threshold differencing as described above may cause a new index frame to be generated or selected several times as the balloon floats across the field of view. In actuality, a single index frame of the balloon against the sky would suffice for a user of the index to find this scene, but using unintelligent frame differencing might cause the video shot to be segmented into several video sequences (i.e. represented by several index frames). There may be index frames produced when the balloon is on the left, when the balloon is in the middle, and when the balloon is on the right.

Using an object recognition technique, the difference calculations utilized above may be modified to yield a lower difference if the same object is tracked across the same background, than would a difference calculation that does not take object motion into account. If, however, a new object appears within the field of view in a subsequent video frame, it will probably not be correlated with a previous object within the video sequence, and thus will cause the difference measurement to be higher. Therefore, object recognition techniques may be utilized in the present invention to reduce the number of redundant index frames selected when a given object merely moves across the field of view, while preserving the ability of the invention to recognize new features that are introduced into the field of view.

Pan detection may similarly be used to enhance the efficiency of the index frame selection process. For a video shot slowly panning across a field of view, as described in the example above, a pan may be detected by utilizing motion estimation techniques. For example, if a large contiguous area of frame 2 was present in frame 1 but shifted by a certain number of pixels, as may be detected by motion estimation techniques as is known to those skilled in the art, this may indicate a pan being performed by the camera. New features gradually enter the side of the screen in subsequent video frames, but some of the features are in common with features in the previous video frames. If simple differencing is utilized, many redundant index frames may be selected. However, if panning is detected, pixel processor 106 can wait until, for example, 50% of the scene depicted at the beginning of a video sequence has scrolled off the field of view, before starting a new video sequence.

It will be understood that the pan detection technique can be combined with other techniques described herein. For example, if a pan is detected then differences caused by the new scenery panning into the picture can be ignored in determining whether to begin a new video sequence. However, during the pan a new feature may appear in the common part of the image, i.e. the portion which is correlated with prior video frames. A large, new object appearing in the region that is in common with prior video frames may still be taken into account in determining whether a new video sequence should be started.

For example, a video shot may pan across a jungle scene, where new features enter the right side of the field of view and old features exit the left side of the field of view. New features, such as a lion in front of the trees in the scene, that enter the field of view because of panning would normally cause a large difference between this video frame and the first reference frame. However, if panning is detected, the a difference measurement will be taken that compares only the common region (e.g. the left side of the current video frames) with the corresponding, motion-compensated region of the first reference frame. The new region with the lion will be ignored, until approximately 50% of the field of view, with respect to the first reference frame, has been panned off the screen. However, if a second lion jumps into the common region before the 50% mark, a difference may be indicated and a new video sequence begun so that the scene with the second lion will be represented by an index frame, as well as the scene before the lion jumped into the scene.

Those skilled in the art will also understand that zoom-detection techniques may also be utilized to enhance the videosequence detection process. If a video'shot begins by depicting a relatively static golf course scene, and slowly zooms in on the flag in a golf hold in the center of the picture, several video sequences may be defined if frame differencing is utilized. As objects in the field of view grow-larger because of the zoom, soon a large difference will be calculated between the current frame and the first reference frame, that is larger than the predetermined threshold difference. This may occur several times until the end of the video shot, even if the scene is static and no new features are revealed other than some increased detail and sharpness of features that are zoomed in on. Those skilled in the art will appreciate that size-invariant object recognition techniques can be utilized in the present invention in such situations. If the golf flag, for example, is recognized in the first reference frame, it may be recognized in subsequent frames even though it grows larger, which may be taken into account in the difference calculation. With zoom recognition, a single index frame may be used to represent the entire zoom-in shot in some instances, where several index frames would be selected without zoom recognition.

During a zoom out, new features constantly enter the field of view, which should be represented by index frames. However, similar to the pan detection technique described above, if zoom out is detected, pixel processor 106 may determine that the region within the first reference frame of a video sequence is present in subsequent video frames, although this region is progressively smaller as the zoom out proceeds. If zoom out is detected and no significant changes occur within the zoom out region, the new features entering the sides of the field of view may be ignored until the zoom out region shrinks to a predetermined fraction of the first reference frame. For example, a video shot may begin with a close up of a golf flag, and gradually zoom out to encompass the entire golf hole. If no significant changes occur in the scenes depicted therein other than new image features gradually zooming into the borders of the picture, a new video sequence can be begun each time the area of the zoom out region has shrunk to 50% of the size of the first reference frame. Those skilled in the art will understand that similar techniques may be utilized with other effect-detection techniques, such as tilt-detection, to improve the index frame selection process.

Those skilled in the art will understand that odd and even interlaced fields are often used in video to update the video screen. When objects move rapidly across the field of view, a given object may be displaced from one field to another, so that artifacts may occur in a given video frame, since the odd and even fields that comprise the video frame may depict the moving object at different locations. Therefore, in alternative preferred embodiments, as will be understood by those skilled in the art, the present invention analyzes differences between video fields rather than video frames, and selects index frames that represent a plurality of video fields.

Index Scanning

Figure 4:
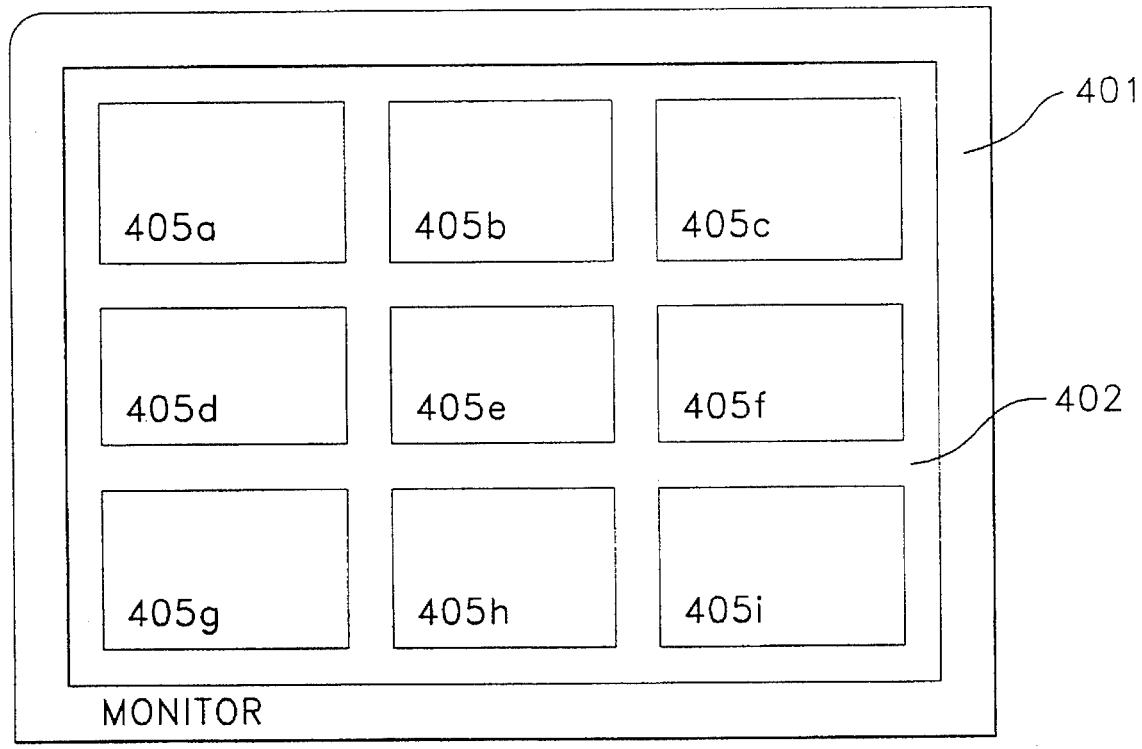
FIG. 4 depicts a monitor displaying index frames of the present invention.

Referring now to FIG. 4, there is depicted a monitor 401 displaying index frames 405$_a$–405$_i$ of the present invention. Monitor 401 contains screen 402, which is utilized to display index frames from the video database index for scanning by the user to locate various scenes or video sequences within the video database that are represented by index frames within the video database index.

In one embodiment of the present invention, the video database index may be scanned by a user by simply viewing each index frame displayed sequentially on a monitor. When an index frame is recognized by the user, he may push a key on a keyboard or click a mouse to stop or back up the stream of displayed index frames and highlight the recognized index frame, whereupon information may be displayed on the screen as to the location of the corresponding video sequence within the video database.

However, more efficient scanning methods may be used as well. As will be appreciated by those skilled in the art, the human visual system is able to recognize objects, scenes, and patterns in several simultaneously-displayed images. It is often possible for a typical user to be able to efficiently scan a plurality of parallel or simultaneously displayed index frames, where the plurality of index frames is updated several times per second.

For example, monitor 401 displays a 3×3 display of nine index frames 405$_a$–405$_i$, wherein each index frame is updated approximately five times per second. At this rate, 9*5=45 index frames may be scanned each second by the user, until an index frame of interest is observed. It will be appreciated that each succeeding displayed screen of nine index frames displays the next nine index frames stored sequentially within the video database index. In a preferred embodiment, the number of index frames displayed simultaneously as well as the frequency of updating the index frames may be varied by a user in accord with the user's skill or comfort level, or depending upon the variation between and complexity of the currently-displayed groups of index frames. For example, a rate slower or faster than five updates per second may be selected, and 16 index frames in a 4×4 array or 6 index frames in a 2×3 array may be displayed.

As described above, pixel processor 106 compresses the index frames it selects before storing them in mass storage device 120 to comprise the video database index. Because index frames may be displayed, for example, in parallel at nine or more per screen, each index frame has fewer pixels and thus less resolution than a typical stored video frame. Therefore, pixel processor 106, may spatially compress index frames before storing them in mass storage device 120. Further, the quality of index frames does not necessarily need to be as high as the image quality of video frames, since the index frames are meant to be used to recognize the video sequence represented thereby rather than to be viewed for their own sake as the video database is. Thus, pixel processor 106 may sacrifice some further image quality to achieve greater data compression when compressing index frames, as long as enough image quality remains so that a human viewer can recognize the image depicted to a sufficient degree so that the index frame can be correlated to a given video sequence.

In alternative preferred embodiments of the present invention, a user may use the video database index not only as an index, but to browse through representative scenes from the video database. In this case the video database index can function much like a slide show where each index frame depicts a slide or scene representative of a video sequence stored in the video database. In such usage a higher image quality might be desired for index frames, and such index frames may be displayed sequentially, at one index frame per screen, rather than displaying index frames in parallel. Thus, it will be appreciated that the above-described spatial and higher data compression techniques may not be used in alternative preferred embodiments so as to retain image quality for each index frame.

On-Line Indexing

It will be understood by those skilled in the art that video processing system 100 may control the speed of VCR 135 so that more or less video frames from VCR 135 may be processed by pixel processor 106 to more efficiently utilize the processing capacity of pixel processor 106. As described above, in a preferred embodiment, index frames are selected and stored during off-line processing by video processing system 100 of the video database. For example, in some embodiments of the present invention an index frame lying temporally between the first and second reference frames is not selected until the second reference frame is received, implying at least some delay in selecting reference frames in these embodiments.

However, in further preferred embodiments, index frames may be selected and displayed on-line, more or less in real-time. For example, where an index has not been prepared ahead of time, a user may desire to skim the contents of a video database stored on a given video cassette, either to browse the contents of the video database or to locate a specific event or events. With, for example, a video database stored in digital form and utilizing a digital VCR interfaced to video processing system 100, pixel processor 106 may receive video frames from the VCR and produce and display index frames in real-time roughly corresponding to the most recently-processed portions of the video cassette. In this embodiment pixel processor 106 preferably may control the speed of the digital VCR to quickly advance the video cassette when little change is occurring, so that the next index frame may be determined quickly enough to display it for the user. Any time a user viewing the database index spots an index frame of interest, the video cassette could very quickly be positioned to the corresponding video sequence, where the user could play the video cassette in a conventional manner.

Further, it will be appreciated that during such on-line indexing, the user may adjust threshold and other parameters to produce more or less index frames. The more index frames produced, in general, the more difficult or tedious or slower will be a scan of the index frames, but the index frames will tend to be more representative of the video database, or more responsive to changes in scenes of the database. Smaller scene changes will cause a new index frame to be produced. Conversely, the fewer index frames produced, the easier will be a scan of the video database index comprising these index frames, but the index frames will tend to be less representative of the video database, or less responsive to changes in scenes of the database. Larger scene changes will be required to cause a new index frame to be produced.

It will further be appreciated that even where a video database index is produced and stored off-line at a given sensitivity level, in further preferred embodiments a user may be given the option while scanning the index to view the index at a lower sensitivity level. For example, if a user determines that too many index frames of redundant aspects of similar scenes are being displayed on monitor 401, the user may select an option to have only every other index frame displayed, thus cutting down by half the number of index frames that the user must scan.

Generating Index Frames

In preferred embodiments of the present invention as disclosed above, each index frame is formed by selecting one video frame within a video sequence to represent the video sequence. Those skilled in the art will understand that a single index frame may be generated that is not a mere duplicate of one of the video frames in the video sequence. For example, some amount of change typically occurs between the video frames constituting a single video sequence. These disparate image features all occurring within the same video sequence may be merged together, overlaid on top of one another, or otherwise used to form a single index frame containing features that may be recognized by a viewer as corresponding to scenes within the video sequence. For example, if one frame of a single video sequence contains a baseball and another video frame of the same video sequence contains a football against the same background, the baseball and football may be merged together using "morphing" techniques. A user seeing this index frame may be able to recognize both a football and baseball in the merged feature, and recognize the video sequence containing both footballs and baseballs.

Alternatively, if several objects move across a relatively unchanging background in a single video sequence, each object can be superimposed on top of the background scenery. For example, if a bear, then a duck, then a cat, walks across a beach, the entire sequence may be selected as a single video sequence. Sophisticated image recognition techniques may be utilized that recognize the bear, duck, and cat objects, and a single composite index frame may be formed that contains the beach with the bear, duck, and cat all on the beach simultaneously. Although no single video frame within the represented video sequence contains all three animals simultaneously, a user viewing this scene could recognize all three scenes at once.

Redundant Index Frames

In preferred embodiments of the present invention as disclosed above, each video sequence is represented by one index frame. Those skilled in the art will understand that several similar video sequences may be represented by a single index frame, rather than each video sequence being represented by one index frame. For example, if video sequence 1 shows person 1 talking, this video sequence (which is also a video shot, as defined above) may be adequately represented by a single index frame 1. This may be followed by video sequence 2 showing person 2 talking. However, often video sequences cut back and forth between person 1 and person 2. If a single index frame is selected to represent each video sequence showing person 1 and each video sequence showing person 2, several index frames may be generated that represent redundant images. For example, if five video sequences of person 1 are alternately displayed in the video database with five video sequences of person 2, ten separate index frames may be generated for each of the ten video sequences (which are also video shots, as defined above), when two index frames may suffice.

Therefore, in an alternative preferred embodiment of the present invention redundant index frames may be eliminated from the video database index. In one embodiment, pixel processor 106 compares each current index frame selected or generated with a predetermined number of prior index frames. If a match is found within a predetermined threshold, the current index frame is thrown away and the prior, similar index frame is updated to point to the currently represented video sequence as well as to prior video sequences that the prior index frame already represented. With this embodiment of the present invention, when the second video sequence depicting person 1 is processed, the index frame generated thereby will be found to be similar to the index frame already generated to represent the first video sequence showing person 1. Thus, only the first index frame is retained in the video database index, with pointers to all video sequences that the index frame represents. For the example given above with ten interwoven video sequences, two index frames 1 and 2 would be selected, with index frame 1 linked to five of the video sequences and index frame 2 linked to the other five video sequences.

In this embodiment, multiple video sequences that are similar enough to be represented by a single index frame are considered to be subsequences that constitute a single video sequence having a sequence of video frames in the video database, although some of the sequence of video frames may be interrupted by portions of other video sequences. Using the aforementioned example, the five video sequences depicting person 1 comprise a single video sequence depicting person 1, wherein the single video sequence is interrupted at times by sequences of video frames from another video sequence. In this manner, each index frame in the video database index represents a unique video sequence of a plurality of video sequences that constitute the video database. Further, each video sequence comprises a sequence of video frames of the video database, and each video sequence has a unique location within the video database. A video sequence comprising subsequences in this manner has a unique location, as defined by the location of its subsequences or of the video frames constituting the subsequences.

A user scanning a video database index as described above and selecting an index frame representative of such a video sequence may be given the locations of the beginning of each subsequence that the video sequence comprises, as will be appreciated by those skilled in the art.

Those skilled in the art will appreciate that for a plurality of index frames that are sufficiently similar to one another in this manner, an index frame other than the first in the plurality may be selected as a "key" index frame that represents all the other index frames as well as all the video sequences represented by the plurality of index frames. For example, of a plurality of index frames that are within a predetermined threshold difference of one another, the index frame that is difference-centered, as defined above, may be selected. When scanning the video database index, if a user selects such a key index frame, he may be offered a view of the plurality of index frames represented by the key index frame, any of which may be selected to determine the video sequence represented by the selected index frame.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A computer-implemented method for generating a video database index for indexing a video database comprising a plurality of video frames, the video database index comprising a plurality of index frames, wherein each video frame within the video database has a unique location within the video database, the method comprising the steps of:

(a) transmitting the video frames of the video database to a processor; and (b) generating with the processor the index frames of the video database index in accordance with the amount of change occurring in images depicted by the video frames of the video database;

wherein:
   each of the index frames represents a unique video sequence of a plurality of video sequences that constitute the video database;
   each video sequence comprises a sequence of video frames of the video database; and
   each video sequence has a unique location within the video database.

2. The method of claim 1, wherein each index frame of the video database index further comprises information corresponding to the location of the respective video sequence represented by each index frame.

3. The method of claim 1, wherein some video sequences of the plurality of video sequences may comprise a plurality of video subsequences.

4. The method of claim 1, wherein each video sequence of the plurality of video sequences represents a scene, wherein the scene represented by a given video sequence of the sequential plurality of video sequences differs by a predetermined threshold amount from scenes represented by video sequences adjacent to the given video sequence.

5. The method of claim 1, wherein step (b) comprises the steps of:

(1) detecting a scene cut between sequences of video frames of the video database;

(2) selecting a first reference frame of the video database index after a detected scene cut;

(3) determining the difference between subsequent video frames and the first reference frame;

(4) selecting a second reference frame when a predetermined threshold difference is determined between the second reference frame and the first reference frame and defining a defined video sequence comprising the plurality of video frames from the first reference frame to the second reference frame;

(5) generating an index frame representative of the defined video sequence; and (6) selecting a subsequent first reference frame to generate index frames for subsequent video sequences.

6. The method of claim 5, wherein:

step (b)(1) comprises the step of detecting a second predetermined threshold difference or scene fade between sequences of video frames of the video database; and step (b)(2) further comprises the step of detecting transition frames and excluding the transition frames from being selected as a first reference frame.

7. The method of claim 6, wherein step (b)(3) comprises the step of determining the motion-compensated difference between subsequent video frames and the first reference frame.

8. The method of claim 6, wherein step (b)(3) comprises the step of determining the difference between subsequent video frames and the first reference frame, wherein motion, panning, and zooms are taken into account.

9. The method of claim 6, wherein the index frame comprises one of the video frames of the video sequence comprising the plurality of video frames from the first reference frame to the second reference frame.

10. The method of claim 9, wherein the index frame comprises a difference-centered video frame of the video sequence comprising the plurality of video frames from the first reference frame to the second reference frame.

11. The method of claim 1, further comprising the step of:

(c) detecting scene cuts between sequences of video frames of the video database; and (d) defining a video shot as comprising a plurality of sequential video frames between two consecutive scene cuts;

wherein each video sequence of the plurality of video sequences comprises a video shot.

12. The method of claim 11, wherein each index frame of the video database index comprises a difference-centered video frame of a unique video shot of the video database.

13. The method of claim 1, further comprising the step of:

(c) storing each index frame of the video database index in a mass storage device.

14. The method of claim 13, further comprising the step of:

(d) displaying a predetermined number of index frames of the video database index in parallel on a monitor; and (e) updating at a predetermined frequency the predetermined number of index frames displayed in parallel on the monitor.

15. The method of claim 14, wherein:

the predetermined number and predetermined frequency may be varied by a user; and each index frame of the video database index further comprises information corresponding to the location of the respective video sequence represented by each index frame; and further comprising the step of:

(f) displaying the location of a video sequence corresponding to an index frame selected by the user.

16. The method of claim 1, further comprising the step of:
   (c) displaying a predetermined number of index frames of the video database index in parallel on a monitor; and
   (d) updating at a predetermined frequency the predetermined number of index frames displayed in parallel on the monitor.

17. The method of claim 16, wherein:
   the predetermined number and predetermined frequency may be varied by a user; and
   each index frame of the video database index further comprises information corresponding to the location of the respective video sequence represented by each index frame; and
   further comprising the step of:
      (e) displaying the location of a video sequence corresponding to an index frame selected by the user.

18. A method of presenting a video database index to a user, the video database index comprising a plurality of index frames and corresponding to a video database, wherein each index frame of the video database index represents a video sequence of a plurality of video sequences of the video database, the method comprising the steps of:
   (a) displaying a predetermined number of index frames of the video database index in parallel on a monitor; and
   (b) updating at a predetermined frequency the predetermined number of index frames displayed in parallel on the monitor.

19. The method of claim 18, wherein:
   the predetermined number and predetermined frequency may be varied by a user; and
   further comprising the step of:
      (c) displaying on the monitor the location of a video sequence corresponding to an index frame selected by the user.

20. An apparatus for generating a video database index for indexing a video database comprising a plurality of video frames, the video database index comprising a plurality of index frames, wherein each video frame within the video database has a unique location within the video database, the apparatus comprising:
   (a) a processor and means for transmitting the video frames of the video database to the processor; and
   (b) means for generating with the processor the index frames of the video database index in accordance with the amount of change occurring in images depicted by the video frames of the video database;
   wherein:
      each of the index frames represents a unique video sequence of a plurality of video sequences that constitute the video database;
      each video sequence comprises a sequence of video frames of the video database; and
      each video sequence has a unique location within the video database.

21. The apparatus of claim 20, wherein each index frame of the video database index further comprises information corresponding to the location of the respective video sequence represented by each index frame.

22. The apparatus of claim 20, wherein each video sequence of the plurality of video sequences represents a scene, wherein the scene represented by a given video sequence of the sequential plurality of video sequences differs by a predetermined threshold amount from scenes represented by video sequences adjacent to the given video sequence.

23. The apparatus of claim 20, wherein means (b) comprises:
   (1) means for detecting a scene cut between sequences of video frames of the video database;
   (2) means for selecting a first reference frame of the video database index after a detected scene cut;
   (3) means for determining the difference between subsequent video frames and the first reference frame;
   (4) means for selecting a second reference frame when a predetermined threshold difference is determined between the second reference frame and the first reference frame and defining a defined video sequence comprising the plurality of video frames from the first reference frame to the second reference frame;
   (5) means for generating an index frame representative of the defined video sequence; and
   (6) means for selecting a subsequent first reference frame to generate index frames for subsequent video sequences.

24. The apparatus of claim 23, wherein:
   means (b)(1) comprises means for detecting a second predetermined threshold difference or scene fade between sequences of video frames of the video database; and
   means (b)(2) further comprises means for detecting transition frames and excluding the transition frames from being selected as a first reference frame.

25. The apparatus of claim 24, wherein means (b)(3) comprises means for determining the motion-compensated difference between subsequent video frames and the first reference frame.

26. The apparatus of claim 24, wherein means (b)(3) comprises means for determining the difference between subsequent video frames and the first reference frame, wherein motion, panning, and zooms are taken into account.

27. The apparatus of claim 24, wherein the index frame comprises one of the video frames of the video sequence comprising the plurality of video frames from the first reference frame to the second reference frame.

28. The apparatus of claim 27, wherein the index frame comprises a difference-centered video frame of the video sequence comprising the plurality of video frames from the first reference frame to the second reference frame.

29. The apparatus of claim 20, further comprising:
   (c) means for detecting scene cuts between sequences of video frames of the video database; and
   (d) means for defining a video shot as comprising a plurality of sequential video frames between two consecutive scene cuts;
   wherein each video sequence of the plurality of video sequences comprises a video shot.

30. The apparatus of claim 29, wherein each index frame of the video database index comprises a difference-centered video frame of a unique video shot of the video database.

31. The apparatus of claim 20, further comprising:
   (c) a mass storage device for storing each index frame of the video database index.

32. The apparatus of claim 31, further comprising:
   (d) a monitor and means for displaying a predetermined number of index frames of the video database index in parallel on the monitor; and
   (e) means for updating at a predetermined frequency the predetermined number of index frames displayed in parallel on the monitor.

33. The apparatus of claim 32, wherein:

the predetermined number and predetermined frequency may be varied by a user; and each index frame of the video database index further comprises information corresponding to the location of the respective video sequence represented by each index frame; and further comprising:

(f) means for displaying on the monitor the location of a video sequence corresponding to an index frame selected by the user.

34. The apparatus of claim 20, further comprising:

(c) a monitor and means for displaying a predetermined number of index frames of the video database index in parallel on the monitor; and (d) means for updating at a predetermined frequency the predetermined number of index frames displayed in parallel on the monitor.

35. The apparatus of claim 34, wherein:

the predetermined number and predetermined frequency may be varied by a user; and each index frame of the video database index further comprises information corresponding to the location of the respective video sequence represented by each index frame; and further comprising:

(e) means for displaying on the monitor the location of a video sequence corresponding to an index frame selected by the user.

* * * * *

UNITED STATES PATENT AND TRADEMARK OFFICE
CERTIFICATE OF CORRECTION

PATENT NO. : 5,485,611

DATED : January 16, 1996

INVENTOR(S) : Brian Astle

It is certified that error appears in the above-identified patent and that said Letters Patent is hereby corrected as shown below:

Title page, second column, *Attorney, Agent or Firm*, delete "Stephen" and insert therefor --Stephan--.

Signed and Sealed this

Fourteenth Day of May, 1996

Attest:

BRUCE LEHMAN

*Attesting Officer*        Commissioner of Patents and Trademarks